(12) United States Patent
Marquis

(10) Patent No.: US 6,305,328 B1
(45) Date of Patent: Oct. 23, 2001

(54) HOOF SHOE

(76) Inventor: Helmut Marquis, Fliederstrasse 40/1, D-89542 Herbrechtingen (DE)

(*) Notice: Subject to any disclaimer, the term of this patent is extended or adjusted under 35 U.S.C. 154(b) by 0 days.

(21) Appl. No.: 09/453,125

(22) Filed: Dec. 2, 1999

(30) Foreign Application Priority Data

Dec. 3, 1998 (DE) .......................... 298 21 595 U

(51) Int. Cl.[7] .............................. A01K 29/00; A01L 3/00
(52) U.S. Cl. ............................. 119/850; 168/12; 168/18; 36/111
(58) Field of Search .................... 119/850, 851, 119/1; 169/4, 12, 16, 15, 17, 18, 29, 13; 36/111

(56) References Cited

U.S. PATENT DOCUMENTS

| | | | |
|---|---|---|---|
| Re. 34,661 | * 7/1994 | Grim | 602/27 |
| 3,794,119 | * 2/1974 | Paiso et al. | 168/18 |
| 4,090,566 | * 5/1978 | Spencer | 168/17 |
| 4,458,431 | * 7/1984 | Sinclair | 36/88 |
| 4,470,466 | * 9/1984 | Nakanishi | 168/18 |
| 4,744,422 | * 5/1988 | Dallmer | 168/18 |
| 5,174,382 | * 12/1992 | Wright | 168/28 |
| 5,403,265 | * 4/1995 | Berguer et al. | 601/151 |
| 5,613,941 | * 3/1997 | Prengler | 602/13 |
| 5,692,570 | * 12/1997 | Akesson | 168/28 |
| 5,711,377 | * 1/1998 | Foster | 168/14 |
| 5,833,639 | * 11/1998 | Nunes et al. | 602/23 |
| 5,868,690 | * 2/1999 | Eischen, Sr. | 601/151 |
| 5,876,364 | * 3/1999 | Herbst | 602/27 |
| 5,983,611 | * 11/1999 | Smahl et al. | 54/82 |

FOREIGN PATENT DOCUMENTS

G91 07 369.3    12/1991  (DE) .

* cited by examiner

*Primary Examiner*—Charles T. Jordan
*Assistant Examiner*—Yvonne R. Abbott
(74) *Attorney, Agent, or Firm*—Harness, Dickey & Pierce, P.L.C.

(57) ABSTRACT

A shoe (1) which can be slipped over a hoof of an animal, particularly a horse, has at least one base part (2) approximately adapted to the hoof, on which base part is formed a wall (3) to be adjusted to the hoof of the animal. On the inner side of the wall (3) is provided an element (11) comprising an elastically deformable material, which element is at least partially surrounded by the wall (3) and can be pressurized with a fluid medium.

20 Claims, 4 Drawing Sheets

HOOF SHOE

BACKGROUND OF THE INVENTION

The invention relates to a shoe which can be slipped over a hoof of an animal, particularly a horse, having a base part in the shape of a horseshoe, on which base part is formed a wall to be adjusted to the hoof of the animal.

A generic shoe, referred to as a horse shoe is disclosed in DE-GM 91 07 369.

This shoe is fitted to the hoof of the horse by means of a plurality of straps, which, however, presents the disadvantage, particularly when galloping, of the straps of the shoe becoming loose, thus risking loss of the entire shoe.

Iron shoes as used for a long time have the disadvantage of having to be fixed to the hoof of the horse with nails or screws, causing damage to the hoof and allowing bacteria to penetrate therein. For this reason, many horses cannot be shod nor consequently ridden. A further disadvantage of known iron shoes is that although they have relatively good properties of adherence on grass or gravel, they nonetheless frequently lead to the horse slipping on asphalt. Nor do iron shoes of this type provide any dampening of the hoof, rather they cause, on the contrary, an unphysiological vibration upon each step, which is damaging to the horny casing of the animal.

SUMMARY OF THE INVENTION

The object of the present invention is therefore to devise a shoe for the hoof of an animal, particularly a horse, providing reliable protection of the hoof, securely attached to the hoof of the animal in all gaits of the animal and which can in addition be used on different ground surfaces.

This object is achieved according to the invention in that an element comprising an elastic material is provided on the inner side of the wall, at least partially surrounded by the wall and which can be pressurized with a fluid medium.

The element according to the invention which surrounds the hoof and can be pressurized with a fluid medium enables the shoe to be very expediently adapted to the hoof of the animal.

As a result, the shoe is seated securely on the hoof in all gaits of the animal and cannot become detached even under very strong stress. The shoe in this way constantly ensures that no part of the foot is subjected to excessive force, hereby preventing injury. This applies particularly to the soft tissue or bulb area to the rear of the foot.

In comparison with conventional iron shoes, the shoe according to the invention has the advantage of being fastenable to the hoof without any corresponding intervention being necessary on the hoof. Furthermore, the shoe according to the invention provides a very firm grip on a wide variety of ground surfaces, and particularly on asphalt. The shoe according to the invention additionally provides very good dampening in all gaits of the horse.

The shoe according to the invention can also be used for medical reasons, for example when horses have hoof problems or the horn quality is poor. This is because the shoe according to the invention can advantageously be removed at any time, allowing the horse to move or stand barehoof. This avoids the absence of hoof contact with the ground, which is the case with other iron shoe arrangements or other known hoof shoes which must be permanently fixed to the hoof, and the natural stimulus of the ground exerted on the naked hoof improves horn quality.

If in a particularly advantageous development of the invention the pressurizable element is provided in the rear and side area of the hoof on the inner side of the wall, the result is a shoe that is very simple to get into or very simple to put on.

Even better fastening of the shoe according to the invention to the hoof is afforded if in a further advantageous development of the invention a band is arranged in the front area of the hoof and attached to the wall.

If in further advantageous developments of the invention the band is attached to the wall by means of an elastic web and at least one strap, the band can be opened by being tipped over the elastic web so as to facilitate getting into the shoe. The at least one strap can then be used to fasten the band to the wall and thus to fasten the shoe to the hoof.

A simple facility to take up sweat within the shoe can be arranged by providing the base part with webs on its side facing the hoof and with clearances located between the webs. This furthermore provides good ventilation to the sole of the hoof.

To allow simple manipulation when removing and fitting the shoe, the pressurizable element can be designed in the form of a tube and provided with a valve.

In an advantageous development of the invention the base part can be of two-part design, the part facing away from the hoof being replaceable and it being possible to fix calks to the side of the base part facing away from the hoof. This makes the shoe adaptable to a wide variety of types and surfaces of terrain. It furthermore allows the part facing away from the hoof and exposed to wear to be replaced when worn out. The calks permit advantageous adjustment of the shoe to very deep turf.

Simple fitting of the base part can be achieved in that the calks can be mounted on that part of the base part which faces away from the hoof in such a way that the part of the base part facing away from the hoof can be fastened to the part of the base part facing the hoof by means of the calks.

If in a further development of the invention female threads are located in the part of the base part facing the hoof and the calks are provided with male threads that can be screwed into the female threads, the result is a simple facility for fastening the calks to the base part of the shoe. At the same time this attaches the two individual parts of the base part together, giving the calks a dual function.

To achieve a simple repair facility for the shoe, the pressurizable element can be replaceable.

If the wall is made of an elastically deformable material, the shoe can be adapted even better to the hoof of the animal.

In a further advantageous development of the invention it can be provided for a support to be mounted on the inner side of the base part and/or the inner side of the wall and/or the inner side of the band. Gel or rigid foam can be used as material for this support. The advantageous result is improved shock-absorption in all gaits of the horse with the avoidance of chafed areas.

To achieve even better protection of the horse's hooves, the support comprising gel or rigid foam can be covered with fabric.

If pins mounted in guide bolts and made of hard metal can be fitted on the part of the base part facing away from the hoof, the result is improved grip for the horse on wet grass, on asphalt or on ice.

BRIEF DESCRIPTION OF THE DRAWINGS

The principles of an exemplary embodiment of the invention are illustrated below.

DETAILED DESCRIPTION OF THE PREFERRED EMBODIMENTS

Figure 1:
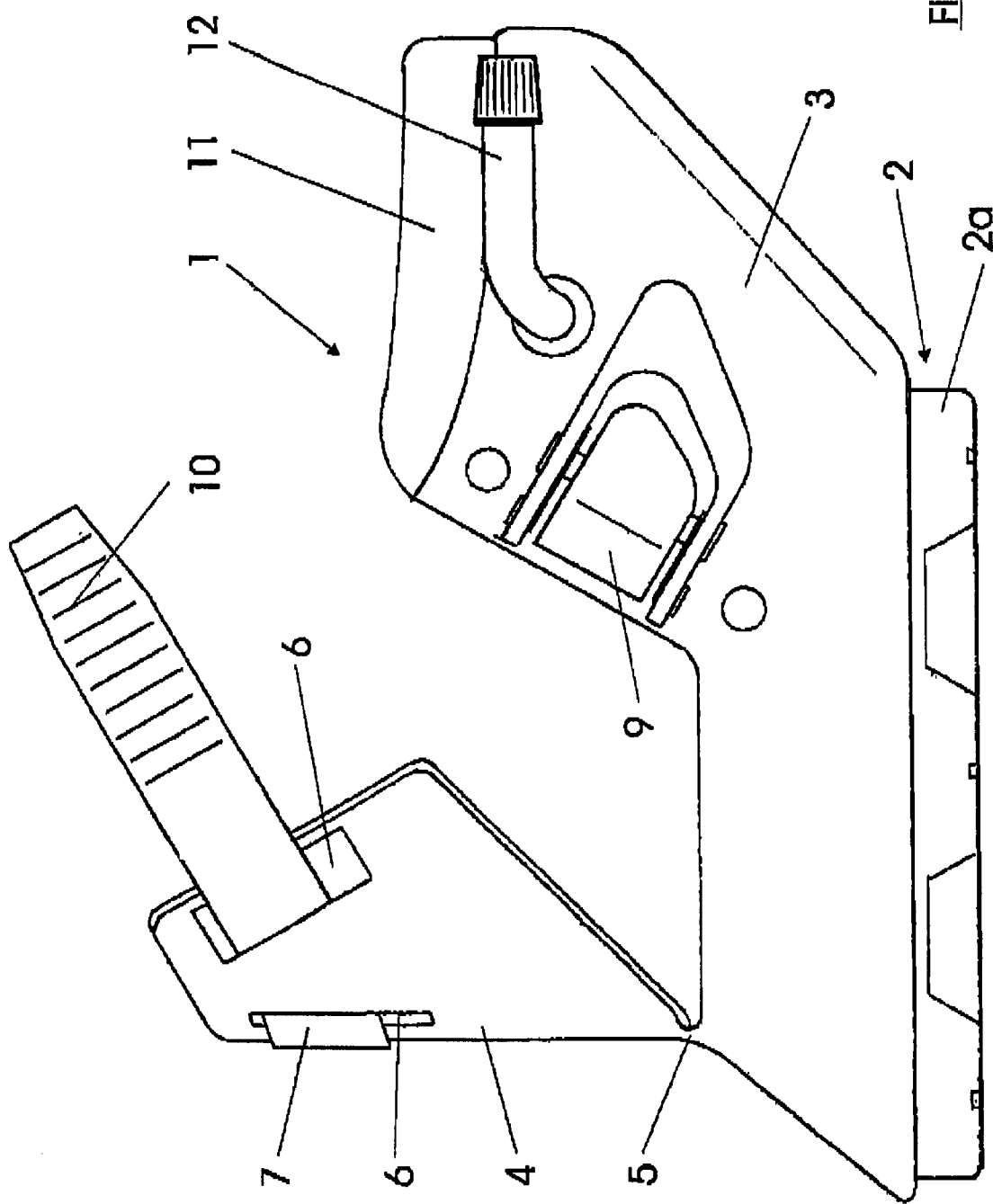
FIG. 1 shows a side view of a first embodiment of the shoe according to the invention.

FIG. 1 shows a shoe 1, for which provision is made to be slipped over a hoof (not shown) of an animal, particularly a horse. The shoe 1 has a base part 2 and a wall 3 made of an elastically deformable material, e.g. plastic, and formed on the base part 2. The wall 3 is approximately adapted to the hoof of the horse and at its front side has a band, flap or toe-flap 4 which is attached to the wall 3 via an elastic web 5 made of the material of the well and can be swung forward. This facilitates getting into the shoe 1 or putting the shoe 1 on the hoof.

Openings 6 are located in the band, flap or toe-flap 4, through which openings passes a strap 7. The strap 7 can be fastened at one of its two ends to a retaining element 8 which is mounted on the wall 3 and illustrated in FIG. 2.

At the other end on the wall 3 is located a clasp 9, through which the strap 7, which is provided in this region with ribbing 10, can be inserted before closing the clasp 9. In this way the band 4 can be fastened by means of the strap 7 to the wall 3 and the shoe 1 can be locked. Naturally it is also possible here to provide two or more straps 7. The ribbing 10 in conjunction with the clasp 9 enables the shoe 1 to be adjusted to various hoof sizes. An altogether smaller shoe 1, with smaller wall 3, can also be envisaged to adapt to different hooves and optionally also to different animals.

An element 11, surrounded by the wall 3, is located in the rear and side area on inner side of the wall 3, which element is designed in the form of a tube and is made of an elastic material, in this instance rubber. A valve 12 is mounted on the tubular element 11, through which valve a fluid medium is introduced into the tubular element 11, enabling the latter to be pressurized. When the hoof is located in the shoe 1 and the band 4 has been closed as described above, the tubular element 11 can be expanded by introducing fluid medium, e.g. compressed air into the latter, causing it to adapt to the hoof.

This conforming of the element 11 to the hook holds the latter firmly in the shoe 1, the hoof bearing against the band, flap or toe-flap 4 in the front area and against the tubular element 11 in the rear and side area. The band, flap or toe-flap 4 is provided on its side facing the hoof with padding (not shown). This makes the connection between the shoe 1 and the hood so secure and firm that, in use, the shoe 1 cannot become lost from horses even when trotting or galloping.

In a further development (not shown), the element 11 can be provided with bosses which prevent it bearing flat against the hoof, thus allowing the tissue on the hoof to breathe.

Figure 2:
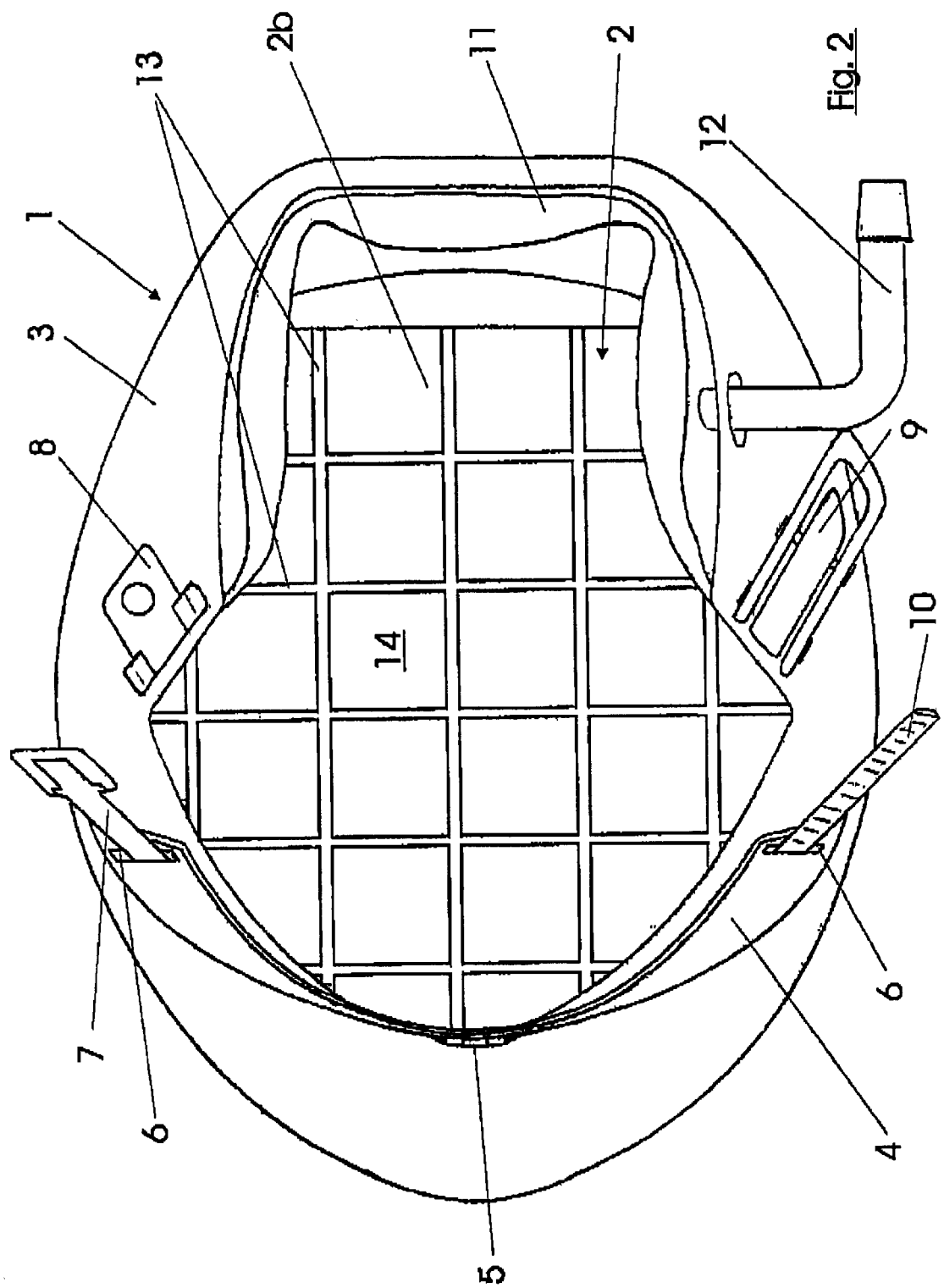
FIG. 2 shows an elevated view of the shoe from FIG. 1.

The base part 2 is of two-part design with a lower part 2a facing away from the hoof and an upper part 2b facing the hoof. The part 2b facing the hoof thus forms the inner side of the shoe 1. As can be seen in FIG. 2, the part 2b of the base part 2 facing the hoof has a plurality of webs 13 running vertical and horizontal in a plane parallel to the base part and clearances 14 located between the webs 13. This results in improved ventilation of the hoof sole and the facility to take up sweat. The elasticity of the material used in the base part 2 additionally allows it to provide very good dampening for the hooves and consequently also for the legs of the horse.

The lower part 2a is attached to the upper part 2b by means of screws (not shown), which engage in female threads (likewise not shown) in the upper part 2b. Naturally other attachment possibilities are also conceivable however, such as bayonet-type closures, rivets or an adhesive attachment. For use in open country or fairly deep turf it is also possible to screw in calks (not shown) instead of screws, the calks being provided with a male thread and able to be screwed into the female thread of the upper part 2b. In this case the calks secure the lower part 2b to the upper part 2b. For use on asphalt the lower part 2a of the base part 2 is made of an elastic material such as rubber or plastic.

The tubular element 11 can also be removed so that the shoe 1 can easily be repaired in case of damage to the element 11. Although the tubular element 11 is attached to the wall 3 by means of rivets, these can be removed in the event of repair and another element 11 can be newly riveted to the wall 3 of the shoe 1.

Figure 3:
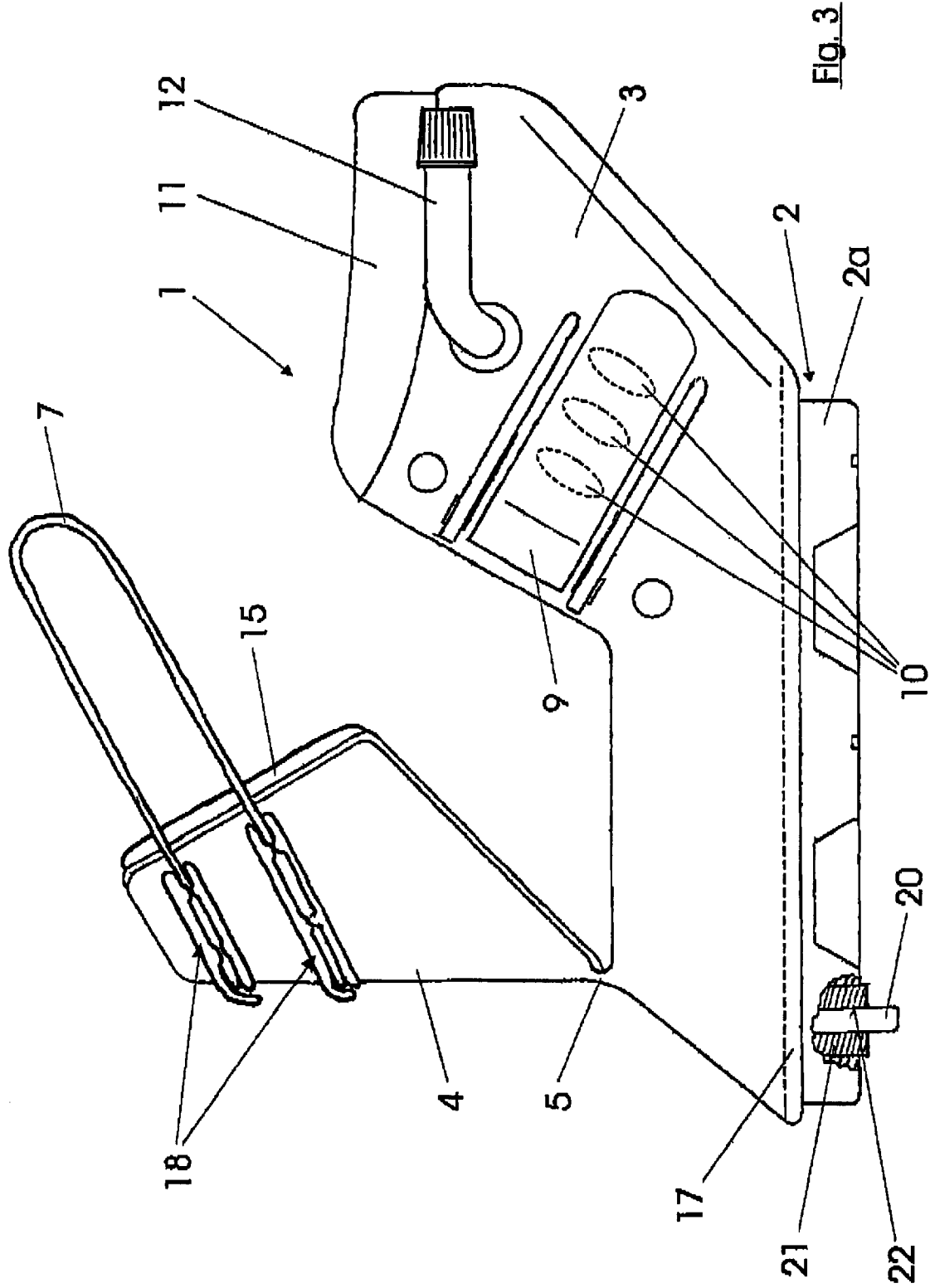
FIG. 3 shows a side view of a second embodiment of the shoe according to the invention.
Figure 4:
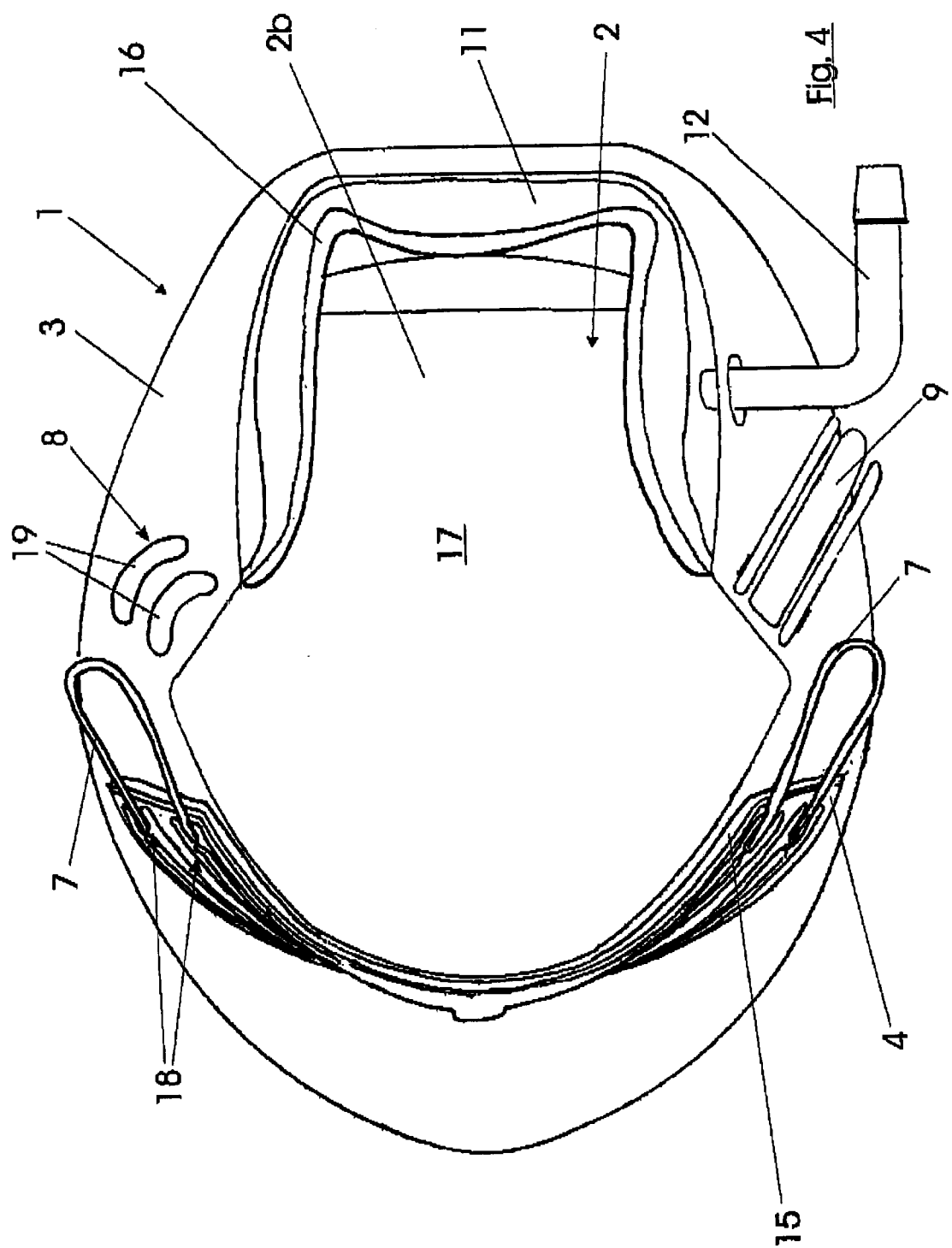
FIG. 4 shows an elevated view of the shoe from FIG. 3.

FIG. 3 and FIG. 4 show an alternative embodiment of the shoe 1.

Here the band, flap or toe-flap 4 is provided on its inner side with a support 15 which in this case comprises gel. It can be seen in FIG. 4 that the tubular element 11 is also provided on its inner side with a support 16 made of gel. The two supports 15 and 16 are adhesively bonded to the band, flap or toe-flap 4 or to the tubular element 11. Furthermore, the clearances 14 in the base part 2 are filled with gel, creating a support 17 here too. The supports 15 and 16 prevent chafed areas on the hoof, the support 17 provides better shock-absorption for the horse's hoof and at the same time a certain messaging effect is brought about for the frog while walking.

As an alternative to the embodiment described, the supports 15, 16 and 17 can also comprise rigid foam. In the present case all the supports 15, 16 and 17 are covered with a fabric which in this way protects them from damage.

It furthermore emerges from FIGS. 3 and 4 that the retaining element 8, the strap 7, the ribbing 10 and the clasp 9 have been modified compared with FIGS. 1 and 2. The strap 7 is designed in the form of an annular wire and clipped into slot-shaped fastening means 18 on the band, flap or toe-flap 4. The ribbing 10 is provided on the clasp 9. The strap 7 is attached on one side to one of two hooks 19 in the present case of the retaining element 8 and on the other side to the ribbing 10 of the clasp 9. The latter is then closed in a manner similar to the operation of a ski boot. This also allows adjustment of the shoe 1 to various hoof sizes.

It can furthermore be seen in FIG. 3 that pins 20 made of hard metal are fitted in the lower part 2a of the base part 2 and are mounted in guide bolts 21. The guide bolts 21 are for example screwed into the lower part 2a and have a bore 22 into which the pins 20 are inserted. A barb then engages (not shown) in a groove in the pin 20, the barb being located within the bore 22 of the guide bolt 21, and holds the pin in the guide bolt 21. The pins 20 provide the horse with better grip for example on wet grass, on asphalt or on ice, the fact that the pins 20 are made of hard metal affording very high wear resistance.

As in the case of the above-described calks, the guide bolts 21 could also bolt the lower part 2a to the upper part 2b. In this way a user could be offered the choice between calks and pins 20. Naturally both calks and pins 20 are also conceivable.

What is claimed is:

1. A shoe which can be slipped over a hoof of an animal having a base part adapted to the hoof, on which base part is formed a wall to be adjusted to the hoof of the animal, wherein an element (11) comprising an elastically deformable material is provided on an inner side of said wall (3), which element is at least partially surrounded by said wall (3) and can be pressurized with a fluid medium, wherein a flap (4) is arranged in a front area of the hoof and attached to said wall (3) by means of an elastic web (5).

2. The shoe as claimed in claim 1, wherein the pressurizable element (11) is provided in the rear and side area of the hoof on the inner side of the wall (3).

3. The shoe as claimed in claim 2, wherein the flap (4) is attached by means of at least one strap (7) to the wall (3), the strap (7) being attached by means of a retaining element (8) and a clasp (9) to the wall (3).

4. The shoe as claimed in claim 1, wherein the pressurizable element (11) is designed in the form of a tube and provided with a valve (12).

5. The shoe as claimed in claim 1, wherein the base part (2) is provided with webs (13) on its side facing the hoof and with clearances (14) located between the webs (13).

6. The shoe as claimed in claim 1, wherein the base part (2) is of two-part design, a first part (2a) facing away from the hoof being replaceable and it being possible to fix calks to the part (2a) of the base part (2) facing away from the hoof, and a second part (2b) facing the hoof.

7. The shoe as claimed in claim 6, wherein the calks can be fixed to the first part (2a) of the base part (2) facing away from the hoof in such a way that the first part (2a) of the base part (2) facing away from the hoof can be fastened by means of the calks to the second part (2b) of the base part (2) facing the hoof, female threads being located in the second part (2b) of the base part (2) facing the hoof and wherein the calks are provided with male threads that can be screwed into the female threads.

8. The shoe as claimed in claim 6, wherein pins (20) made of hard metal can be fitted on the first part (2a) of the base part (2) facing away from the hoof and are mounted in guide bolts (21).

9. The shoe as claimed in claim 1, wherein the pressurizable element (11) is replaceable.

10. The shoe as claimed in claim 1, wherein the wall (3) is made of an elastically deformable material.

11. The shoe as claimed in claim 1, wherein a support (15, 16, 17) is mounted on the inner side of the base part (2) and the inner side of the wall (3) and the inner side of the flap (4).

12. The shoe as claimed in claim 11, wherein the support (15, 16, 17) has a gel and a rigid foam and is covered with a fabric.

13. The shoe as claimed in claim 11, wherein the support (15, 16, 17) has a gel and is covered with a fabric.

14. The shoe as claimed in claim 11, wherein the support (15, 16, 17) has a rigid foam and is covered with a fabric.

15. The shoe as claimed in claim 1, wherein a support (15, 16, 17) is mounted on the inner side of the base part (2).

16. The shoe as claimed in claim 1, wherein a support (15, 16, 17) is mounted on the inner side of the wall (3).

17. The shoe as claimed in claim 1, wherein a support (15, 16, 17) is mounted on the inner side of the flap (4).

18. The shoe as claimed in claim 1, wherein a support (15, 16, 17) is mounted on the inner side of the base part (2) and the inner side of the wall (3).

19. The shoe as claimed in claim 1, wherein a support (15, 16, 17) is mounted on the inner side of the base part (2) and the inner side of the flap (4).

20. The shoe as claimed in claim 1, wherein a support (15, 16, 17) is mounted on the inner side of the wall (3) and the inner side of the flap (4).

* * * * *

UNITED STATES PATENT AND TRADEMARK OFFICE
CERTIFICATE OF CORRECTION

PATENT NO.    : 6,305,328 B1                                    Page 1 of 1
DATED         : October 23, 2001
INVENTOR(S)   : Helmut Marquis It is certified that error appears in the above-identified patent and that said Letters Patent is hereby corrected as shown below:

<u>Column 3,</u>
Line 44, "hook" should be -- hoof --.
Line 50, "hood" should be -- hoof --.

<u>Column 4,</u>
Line 10, "2b" should be -- 2a --.

Signed and Sealed this

Twenty-first Day of January, 2003

JAMES E. ROGAN
*Director of the United States Patent and Trademark Office*